Sept. 8, 1936.　　　　　E. MAY　　　　2,053,966
MOTION PICTURE PROJECTING APPARATUS
Filed April 2, 1935
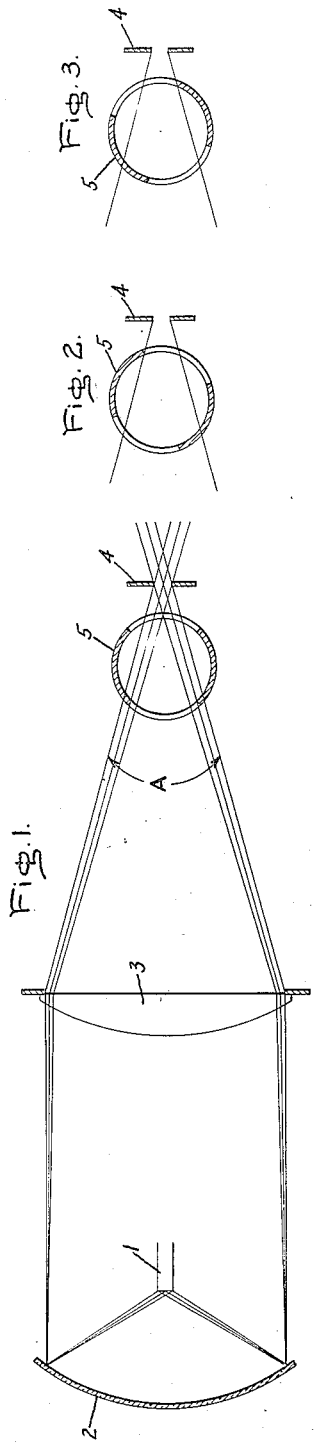
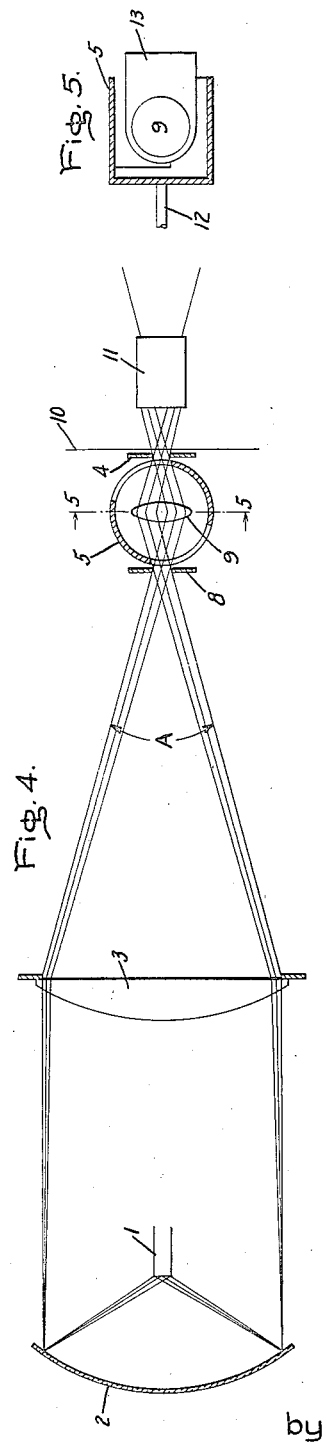
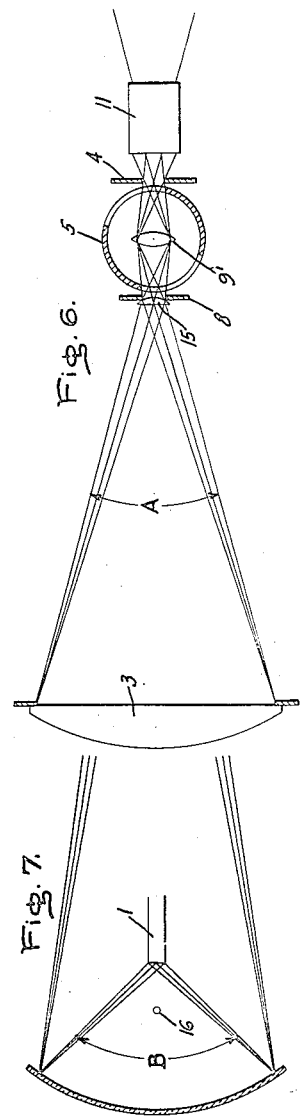
Inventor:
Erwin May,
by Harry E. Dunkan
His Attorney.

Patented Sept. 8, 1936

2,053,966

UNITED STATES PATENT OFFICE 2,053,966

MOTION PICTURE PROJECTING APPARATUS

Erwin May, Berlin-Oberschoneweide, Germany, assignor to General Electric Company, a corporation of New York Application April 2, 1935, Serial No. 14,324
In Germany April 11, 1934

4 Claims. (Cl. 88—19.3)

My invention relates to motion picture projecting apparatus and particularly to the optical system thereof including the shutter.

It is the object of my invention to provide improved apparatus of this character whereby less loss of light occurs by reason of the action of the shutter.

My invention will be better understood from the following description taken in connection with the accompanying drawing, and its scope will be pointed out in the appended claims.

Referring to the drawing, Fig. 1 illustrates a form of apparatus heretofore employed; Figs. 2 and 3 represent the shutter of the same apparatus in two different positions; Fig. 4 illustrates one form of my invention; Fig. 5 is a cross-sectional view taken on line 5—5 of Fig. 4; Fig. 6 is a view similar to Fig. 5 showing a modification thereof; and Fig. 7 illustrates the use of a reflector without a condensing lens.

In Fig. 1, where I have shown a form of apparatus heretofore employed for the purpose of more clearly describing my invention, light from a suitable source 1 is reflected by the mirror 2 to the condenser 3 where the light rays are caused to converge to a focal point at which the fixed diaphragm 4 is placed having therein the usual window. Between the condenser 3 and the diaphragm 4 is the cylindrical rotatable shutter 5 having openings of equal size on opposite sides thereof. In Fig. 1 the shutter is represented in a symmetrical position with respect to the light rays in which position the light rays pass freely through that opening which at that instant is nearer the window. The other opening in the shutter, however, partially obstructs the light rays at the upper and lower portions of the converging beam; hence there is a certain amount of light lost when the shutter is in this position. When the shutter is in the position shown by Fig. 2 where again there is no interruption of the light at that opening of the shutter nearer the window, there is a very considerable loss of light at the opposite side of the shutter where the lower portion of the beam is intercepted. In like manner when the shutter is in the position shown by Fig. 3 there is a very considerable loss of light at the upper portion of the beam.

Referring now to Fig. 4 which illustrates one form of my invention, I employ a light source 1, a reflector 2 and a condenser 3 similar to the corresponding parts shown in Fig. 1, whereby the light rays are caused to converge making an angle A, the same as in Fig. 1. At the focal point of the rays corresponding in position to the window in diaphragm 4, I arrange a fixed shield or diaphragm 8 having a suitable opening through which the rays may freely pass. Beyond the diaphragm 8 I place the lens 9 which causes the light to pass a second focal point at which point I place the diaphragm 4 having therein the window. Adjacent the diaphragm 4 I have shown the picture film 10 and beyond the film is the usual objective 11. Surrounding the lens 9 is the cylindrical shutter 5 which is arranged to intercept the light beam substantially at the two focal points mentioned above whereby the amount of light lost due to the shutter is reduced to a minimum. The shutter 5 may be mounted in any suitable manner. In Fig. 5 I have shown the shutter having one closed end and as mounted on the rotatable shaft 12, and the lens 9 is shown supported in a suitable holder 13 projecting into the open end of the shutter.

In the modified form of my invention illustrated by Fig. 6, I employ the additional lens 15 mounted adjacent to the diaphragm 8. As a result of this additional lens 15 I am able to employ a smaller lens 9' within the shutter than is possible with the construction shown in Fig. 4. In this form of my invention it will be noted that the cylindrical shutter 5 functions substantially the same as in Fig. 4 since it intercepts the light beam substantially at two focal points thereof and hence very materially reduces the amount of light lost.

Should one attempt to reduce the light loss which follows the use of the apparatus shown in Fig. 1 by omitting the condenser 3 so as to reduce the angle A of the converging beam, it will be noted that in such a case the light source must be moved back from the focus 16 of the mirror as indicated in Fig. 7. That change of position of the source, however, reduces the angle of the light beam emanating from the source to one of a lower value as shown at B and a very material loss in the amount of light received by the reflector results therefrom.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Motion picture projecting apparatus comprising a light source, means for concentrating light therefrom to a focal point, a lens arranged beyond said point for producing a second focal point through which a picture film is adapted to be passed and a rotatable cylindrical shutter surrounding said lens and arranged to intercept the light adjacent said focal points.

2. Motion picture projecting apparatus comprising a light source, means for concentrating light therefrom to a focal point, a lens arranged beyond said point for producing a second focal point, a fixed diaphragm adjacent to said first point, means forming a window adjacent to said second point past which a picture film is adapted to be passed and a rotatable cylindrical shutter surrounding said lens and arranged to intercept the light adjacent to said focal points.

3. Motion picture projecting apparatus comprising a light source, means for concentrating light therefrom to a focal point, a lens arranged beyond said point for producing a second focal point through which a picture film is adapted to be passed and a rotatable cylindrical shutter surrounding said lens and arranged to intercept the light adjacent said focal points, and a second lens arranged adjacent to said first focal point.

4. Motion picture projecting apparatus comprising a light source, means for concentrating light therefrom to a focal point, a convex lens arranged beyond said point for producing a second focal point, an objective arranged beyond said second point, a fixed diaphragm and a convex lens adjacent to said first focal point, a diaphragm having a window adjacent to said second focal point and a rotatable cylindrical shutter surrounding the first mentioned lens and arranged to intercept the light adjacent to each of said focal points.

ERWIN MAY.